United States Patent
Fuhrmann et al.

[19]

[11] Patent Number: 6,101,589
[45] Date of Patent: Aug. 8, 2000

[54] HIGH PERFORMANCE SHARED CACHE

[75] Inventors: Horst Fuhrmann, Böblingen; Jörg Wedeck, Holzgerlingen; Dieter Wendel, Schönaich; Udo Wille, Holzgerlingen, all of Germany

[73] Assignee: International Business Machines Corporation, Armonk, N.Y.

[21] Appl. No.: 09/058,431

[22] Filed: Apr. 10, 1998

[30] Foreign Application Priority Data

Apr. 1, 1998 [EP] European Pat. Off. ............. 98105949

[51] Int. Cl.[7] ..................................................... G06F 12/00
[52] U.S. Cl. ........................... 711/169; 711/127; 711/118; 711/130; 714/5
[58] Field of Search .................................... 711/118, 105, 711/121, 127, 129, 169, 130; 714/6

[56] References Cited

U.S. PATENT DOCUMENTS

| | | | |
|---|---|---|---|
| 4,056,845 | 11/1977 | Churchill, Jr. ........................... | 711/127 |
| 4,445,174 | 4/1984 | Fletcher .................................. | 711/121 |
| 4,905,141 | 2/1990 | Brenza .................................... | 711/129 |
| 5,347,648 | 9/1994 | Stamm et al. ............................ | 714/5 |
| 5,581,734 | 12/1996 | DiBrino et al. ......................... | 711/169 |
| 5,745,913 | 4/1998 | Pattin et al. ............................. | 711/105 |

*Primary Examiner*—Do Hyun Yoo
*Assistant Examiner*—Nasser Moazzami
*Attorney, Agent, or Firm*—Lynn L. Augspurger

[57] ABSTRACT

A high performance cache unit in a multiprocessing computer system comprises a shared level n cache 15 which is divided into a number of independently operated cache cores each of which containing a cache array for being used as buffer between plurality of processing units PU0–PU1 and a memory 18. Data requests and response requests issued by the processing units are separately executed in an interleaved mode to achieve a high degree of concurrency. For this purpose each cache core comprises arbitration circuits 101, 106 for an independent selection of pending data requests and response requests for execution. Selected data requests are identified by a cache directory lookup as linefetch-match or linefetch-miss operations and separately stored during their execution in operation registers 112, 114. Selected response requests are stored independently of the data requests in registers 105, 108, 109 and successively executed during free operation cycles which are not used by the execution of data requests. In this manner each of the cache cores can concurrently perform a linefetch-match operation, a linefetch-miss operation and a store operation for one processing unit or for a number of processing units.

24 Claims, 8 Drawing Sheets

HIGH PERFORMANCE SHARED CACHE

FIELD OF THE INVENTION

The invention relates to a high performance cache unit in a computer system having a plurality of processing units for performing multiprocessing tasks. Each of the processing units being connected by port means to a shared level n cache which serves as buffer between said processing units and a main memory. The invention also relates to method for high performance caching of instructions and data in a multiprocessing computer system.

BACKGROUND OF THE INVENTION

Known multiprocessing systems comprise a plurality of processors and a hierarchy of storages including at least two levels of caches which are used as instruction and data buffers between the processors and the main memory. Each processor may have its private level 1 cache which is usually integrated in the processor chip, and a private level 2 cache on a separate chip. In such systems extensive communication between the private level 2 caches is required which burdens bus operations to a large extent.

Other multiprocessing systems use beside private level 1 a level 2 cache which is shared among a number of processors and the memory (U.S. Pat. No. 5,490,261). A number of CPUs each comprising a private L1 cache is assigned to a L2 cache using interleaves. Each CPU is associated with a request register. A L2 directory is connected to an input priority circuit which receives all requests of the CPUs for an access to the L2 cache. The priority circuit selects one request at a time for accessing the L2 cache directory. A high-order field in the selected request selects a row in the directory and a comparison with an address portion finds any assigned cache directory entry and associated cache data unit location. Each L2 directory entry contains a CPU identifier field which is set to a value that can identify one CPU as the current exclusive owner of the corresponding data unit in the L2 cache. The known system also uses queue and FIFO storages to store the incoming requests each of which contains both address and data until they are selected by the priority circuit. This also applies to store commands since cache store operations are not requests but handled as store commands.

Shared level 2 caches (or shared level 3 or level n caches) offer a number of advantages over private L2 caches. If seen by one of the processing units or CPUs, the cache size appears much larger at the same chip costs. Duplicate cache line entries and cross-cache communications are avoided and thus network traffic can be reduced. On the other hand, shared L2 caches have also some disadvantages including the need of arbitration among the processing units which request cache access. By this bottleneck the busy time increases and in turn the queuing time of the multiprocessing tasks increases. As a consequence, the processor performance and the MP-factor can decrease significantly.

An efficient measure to improve the MP-factor consists in splitting the L2 cache into independent units such as banks with separate address classes. Mak et al, "Shared-cache clusters in a system with a fully shared memory", IBM Journal of Research and Development, Vol. 41, No. 4/5, July/September 1997, pages 429–448, disclose a multiprocessing system using a shared L2 cache in a cluster design which comprises multiple shared cache clusters each supporting a number of microprocessors. In an implementation example, three processing units are assigned to a cluster of two independent L2 cache chips each having its own cache directory. Up to 12 processing units may use up to four L2 cache clusters. Processing unit interface controllers provide fetch and store requests to the L2 cache from three processing units, and a bus switch controller provides the interface to a shared L2,5 cache and the main memory as well as to the other shared L2 clusters to support the cross communication between the independent L2 units as described above.

It is an object of the invention to improve the efficiency of multiprocessing systems using shared level n caches.

According to another object of the invention the performance of shared level n cache design is increased by a higher degree of concurrency in the cache operations.

It is another object of the invention to perform three of the most often used cache operations concurrently.

SUMMARY OF THE INVENTION

According to the invention, as defined in claims 1 and 18, data requests and response requests which are issued by one or more of a plurality of processing units are separately processed to achieve concurrent execution.

Data requests and response requests of one or more processing units are separately stored, and priority based selections of the stored data requests and the stored response requests are independently performed. The address portions of said selected data requests are used for directory lookup operations to determine whether a linefetch-match operation or a linefetch-miss operation has to be executed. The address and operation command data of a linefetch-match operation and a linefetch-miss operation are independently stored during their execution in separate operation and address registers. Similarly, address and operation command data of a response request operation are stored during its execution in separate operation and address registers.

A linefetch-match operation and a linefetch-miss operation and a response request operation are concurrently executed. If a linefetch-miss situation is determined, a memory access operation is initiated during which a linefetch-match operation is interleaved with a response operation. For this purpose a read operation of two data units is concurrently performed in one operation cycle of the cache array leaving each second operation cycle available for a write operation to permit interleaving a read cycle of said linefetch-match operation with a write cycle of a response operation in succeeding operation cycles.

The shared level n cache is divided into a plurality of parallel cache cores which are operated independently of each other to execute data requests and response requests of one or more processing units in parallel. Each of the processing units is connected by a plurality of ports to each of said cache cores. Each of said ports comprises a first-in-first-out storage for storing a plurality of data requests of one or more processing units and further comprises a first-in-first-out storage for each of said cache cores for storing a plurality of response requests from one or more processing units directed to the related cache core.

BRIEF DESCRIPTION OF THE DRAWINGS

A preferred embodiment of the invention is subsequently described with reference to accompanying drawings which show.

DETAILED DESCRIPTION OF A PREFERRED EMBODIMENT OF THE INVENTION

Figure 1:
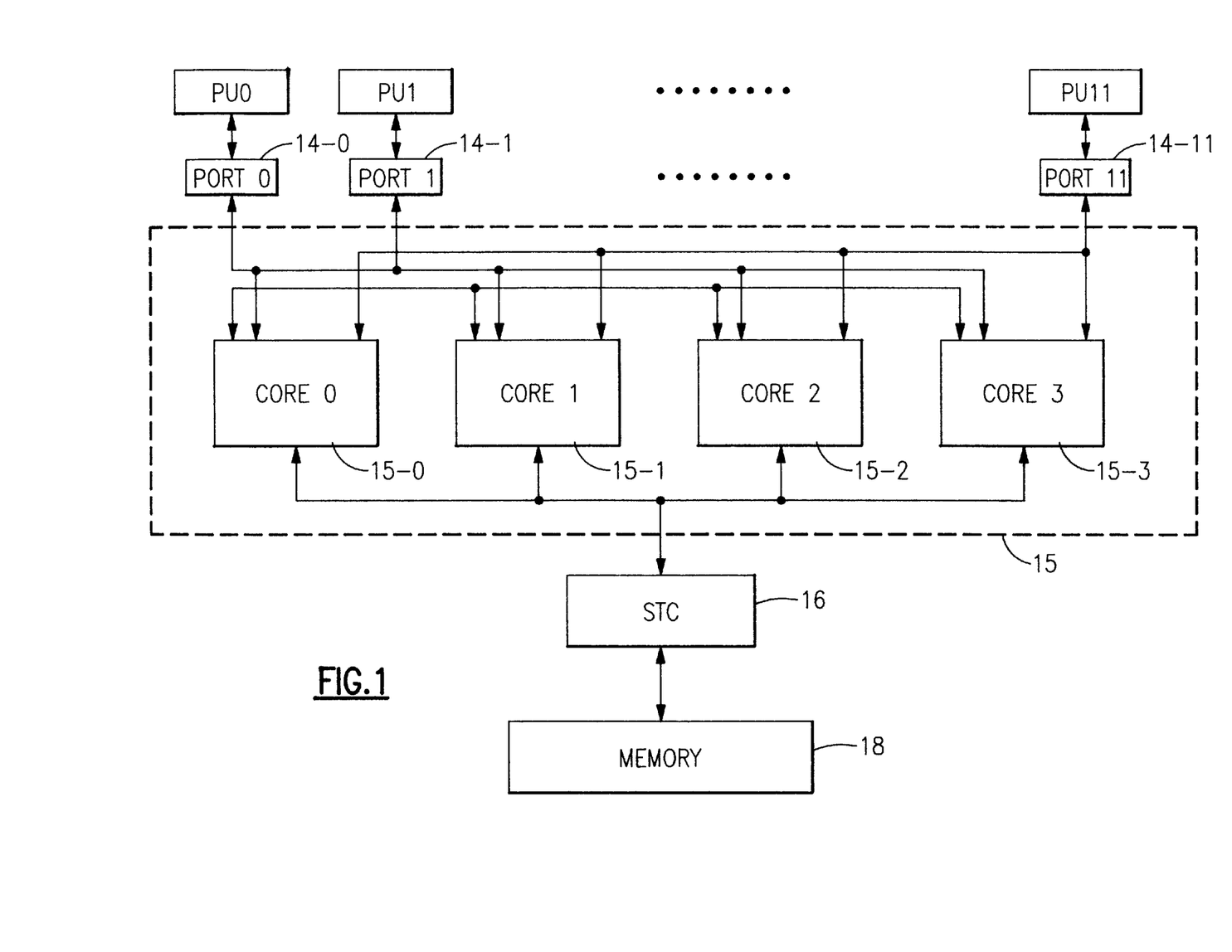
FIG. 1 a general block diagram of a multi-processor system which comprises an embodiment of the invention.
Figure 2:
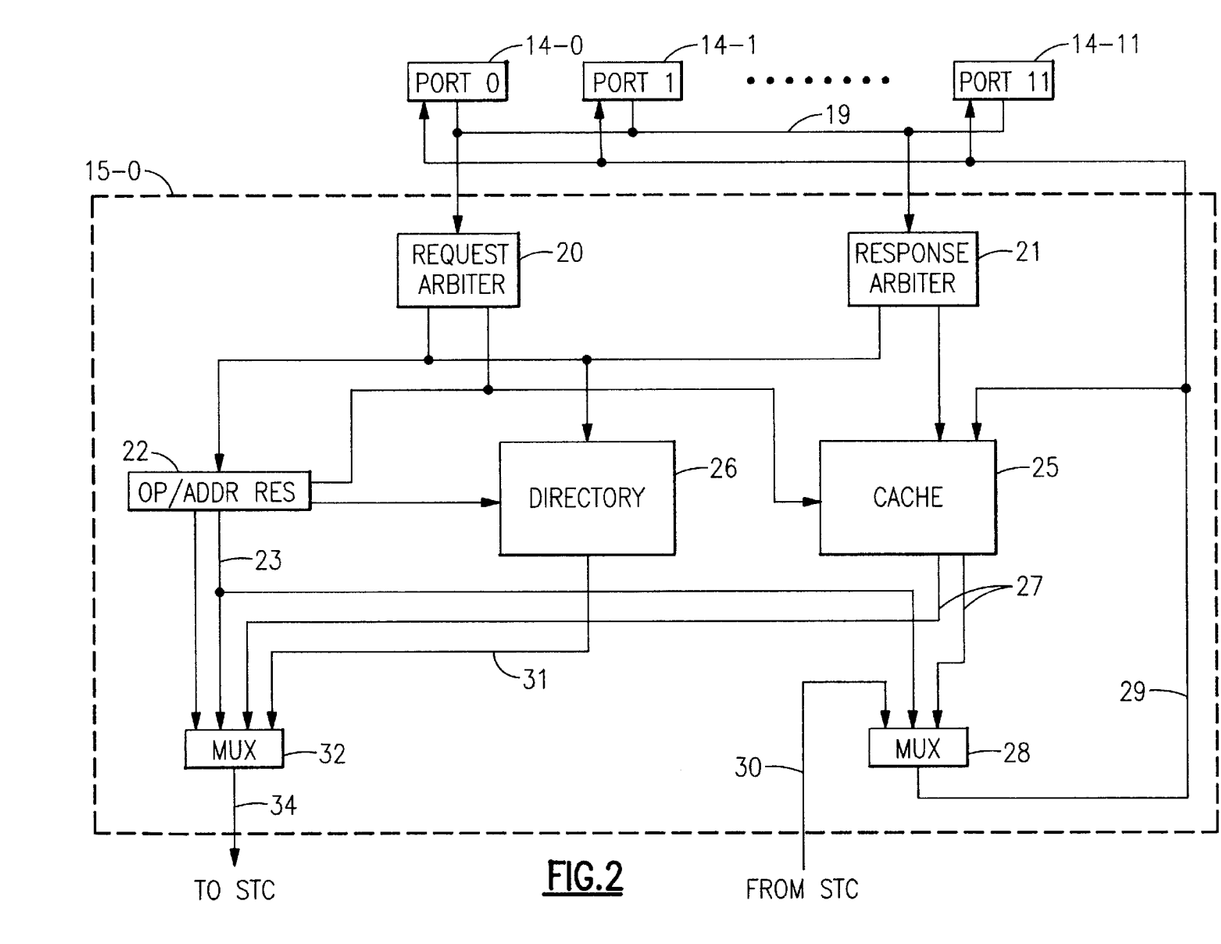
FIG. 2 a general block diagram of the dataflow of a shared level 2 cache core as used in the system of FIG. 1.

The multi-processor system of FIG. 1 comprises processing units PU0 to P11 which are operating independently of each other to perform multiprocessing tasks. Each of the processing units contains a private level-1 cache (not shown) which is used as an instruction and data cache. Each of the PUs is connected by a port 14 to a level-2 cache 15 which is common to all PUs and operates as shared cache. Via a storage controller 16 the cache 15 is connected to memory 18 which is equally shared by all PUs. The cache 15 is divided into four cores 15-0 to 15-3 which work in parallel. Each of the cores is organized in sets and rows so that a cache core access addresses one compartment which contains a cache line which may be, for example, 64 bytes wide. FIG. 2 shows some of the components of one of the cache cores and presents a general view of its dataflow. Arbitration circuits 20, 21 are connected to the output bus 19 of the ports 14-0 to 14-11 and perform a selection of one of the PUs 0–11 for a communication with the cache core 15-0. The arbitration circuits 20, 21 work in a known manner by using a suitable selection algorithm such as a round-robin algorithm to grant one of the competing PUs access to the cache core. The cache access may be a request for a cache line by one of the PUs or provide a response of one of the PUs to the cache. Responses are usually store operations, or cross-cache invalitation responses. The arbitration circuit 20 handles PU requests and arbitration circuit 21 handles PU responses. Both arbitration circuits operate simultaneously and independently of each other to connect one of the PU-ports 14-0 to 14-11 to registers 22. A cache array 25 is supported by a cache directory 26 which contains a plurality of entries each assigned to a line of the cache 25. Each entry of the cache directory 26 contains the address of a cache line and status information on its use including a change tag which indicates the update status of the line and information which allow to determine the last recently use of that line. Both the cache 25 and the directory 26 are set associative and addressed by the registers 22 which consists of a set of OP-registers and address registers for each of the cache cores 15-0 to 15-3. An output bus 27 of the cache 25 is connected through a multiplexer 28 and a bus 29 to the PU-ports 14-0 to 14-11 and back to the input of the cache 25. Further inputs of the multiplexer 28 are an output bus 30 of the storage controller 16 and output lines 23 of the OP-registers 22. The output bus 27 of the cache 25, output lines 31 of the directory 26 and the output lines 23 of the OP-registers 22 are connected through a multiplexer 32 to an input bus 34 of the storage controller 16.

Figure 3:
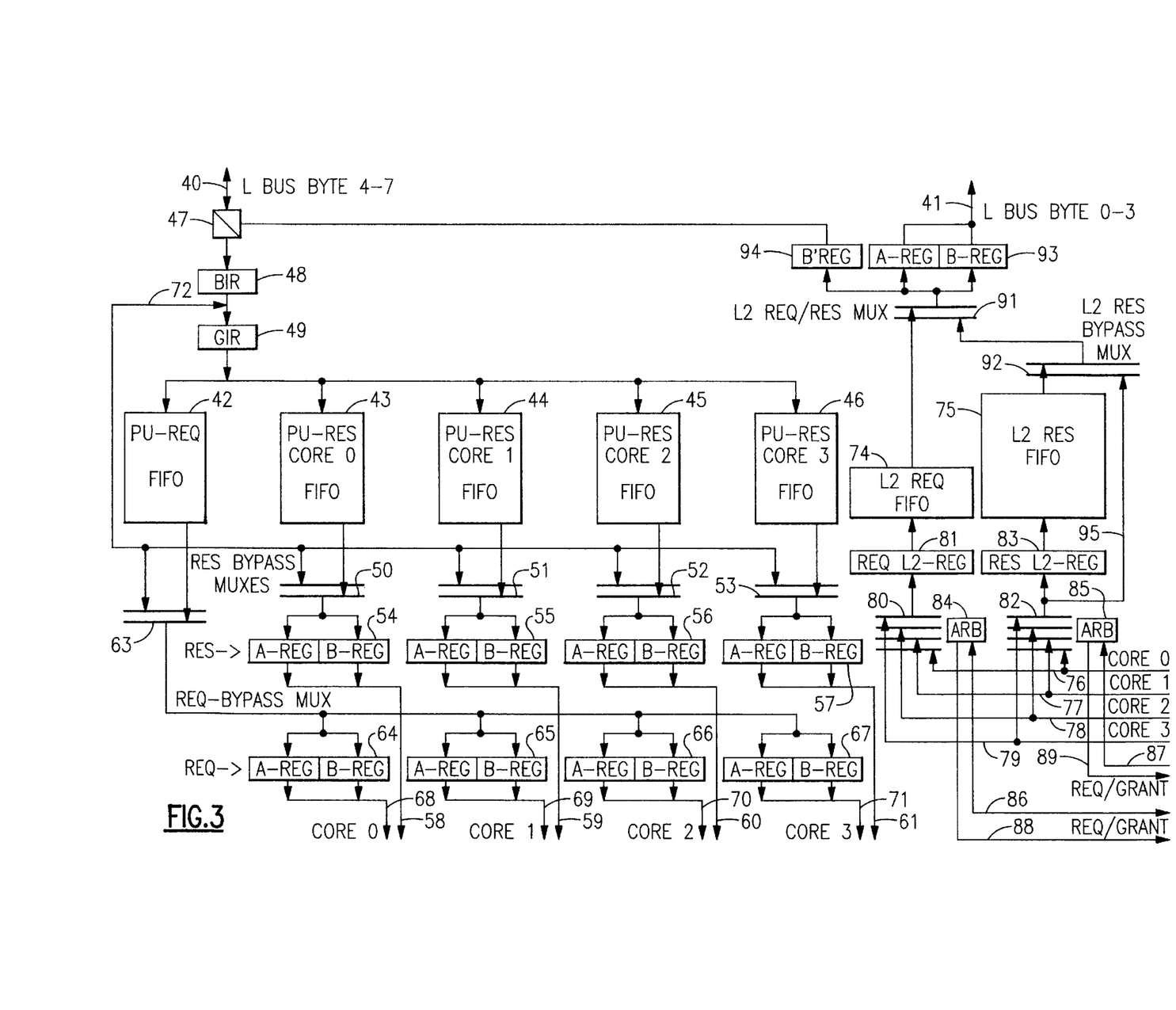
FIG. 3 a block diagram of the data flow of a processor unit port provided in the system of FIG. 1 to connect a processor unit with the shared level 2 cache of FIG. 2.

The FIG. 3 shows the dataflow of the PU port 14-0 as a representative example of the PU ports 14-0 to 14-11. The PU ports implement an interface between the PUs and the L2 cache 15 which is 8 byte wide. This interface comprises in each port a bidirectional bus 40 and an unidirectional bus 41 each being 4 byte wide. On bus 40 a PU can send headers A and B or data.

Header A represents an address of a cache line and header B represents a command OP-code byte and routing information. When the PU expects linefetch data coming back, it switches bidirectional bus 40 to the receive mode so that the PU receives data items of 8 byte each. From the PUs seen, a line of 64 bytes are received by the PU in 8 cycles of 8 bytes each. A store operation of 64 bytes requires the interface to perform 16 cycles plus headers A and B.

On the input side five first-in-first-out storages are provided to buffer the input from bus 40. A first-in-first-out storage 42 buffers the incoming headers A and B of PU requests such as linefetch requests. Furthermore, first-in-first-out storages 43, 44, 45, 46 buffer PU responses such as store operations and line invalidate responses. Each of the storages 43–46 is assigned to one of the cache cores 15-0 to 15-3. The storages 42–46 are connected to the bus 40 via a direction switch 47 and registers 48, 49. The output of each of the storages 43 to 46 is connected to the input of the assigned cache cores 15-0 to 15-3 through corresponding ones of response bypass multiplexers 50–53, response registers 54–57 and busses 58–61. The output of the storage 42 is connected to the input of one of the cache cores 15-0 to 15-3 through a request bypass multiplexer 63, one of request registers 64–67 and one of the busses 68–71. The input from bus 40 can bypass the first-in-first-out storages 42–46 by lines 72 which connect the output of register 48 directly to the second inputs of response bypass multiplexers 50–53 and of request bypass multiplexer 63.

On the output side a L2-request first-in-first-out storage 74 and a L2-response first-in-first-out storage 75 are provided to buffer the cache outputs. Cache core output busses 76, 77, 78, 79 are connected through a multiplexer 80 and a L2-Request register 81 to the input of storage 74, and through a multiplexer 82 and a L2-Response register 83 to the input of storage 75.

Storage 74 buffers headers of cross-L1-cache invalidation requests and storage 75 buffers linefetch data. The multiplexer 80 and 82 are controlled by arbitration circuits 84, 85 which receive from the cache cores 15 request signals on lines 86, 87 and send to the cache cores 15 grant signals on lines 88, 89. The outputs lines of the storages 74 and 75 are connected through multiplexer 91 and 92 and a register 93 to output bus 41. The multiplexer 91 serves as L2-request/response multiplexer is also connected to a register 94 the content of which is transferred via direction switch 47 to the bus 40. Multiplexer 92 serves as L2-bypass multiplexer which transfers the output from the busses 76–79 via multiplexer 82 and lines 95 directly to the second input of multiplexer 92.

Figure 4:
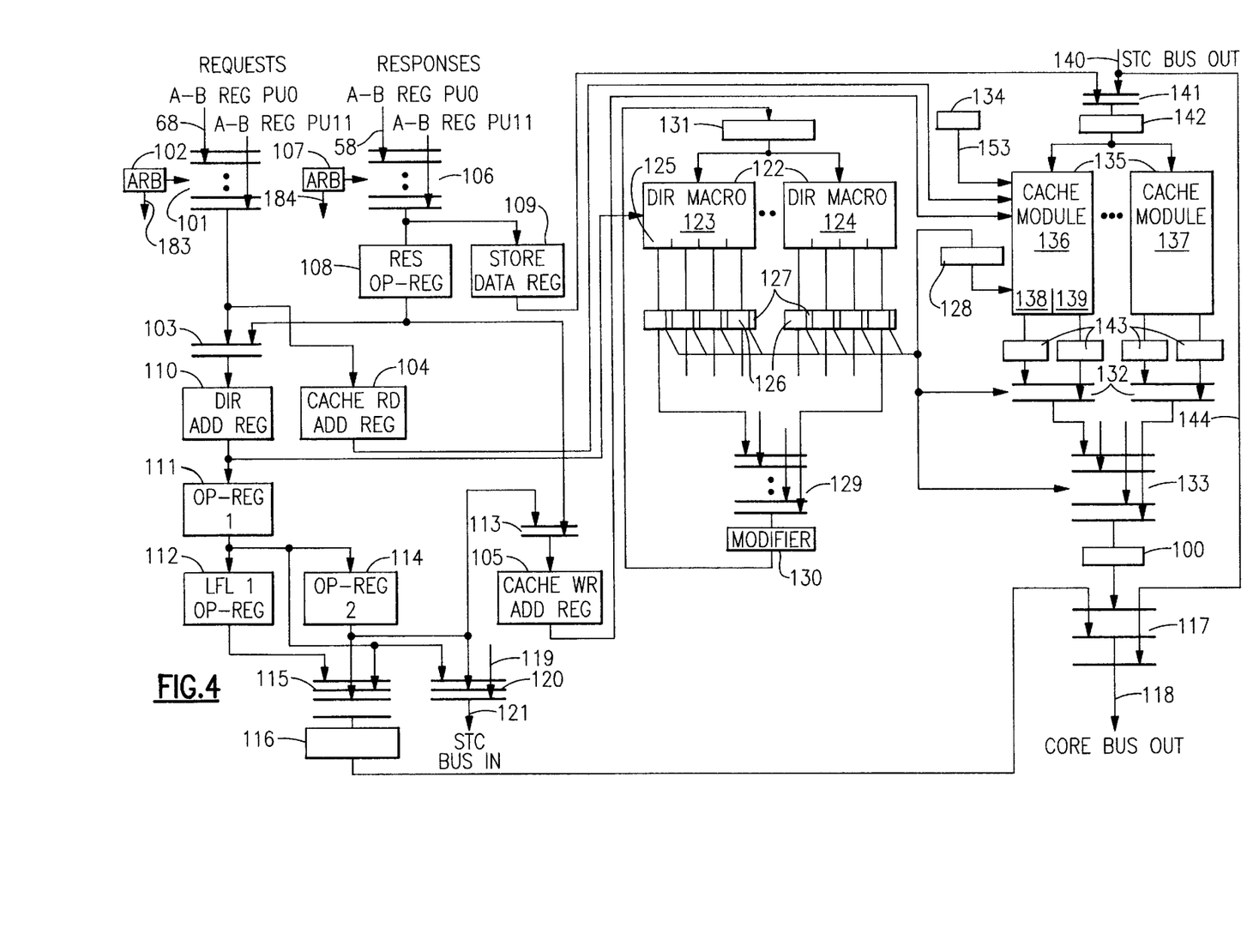
FIG. 4 a block diagram depicting more details of the L2 cache core shown in FIG. 2.

FIG. 4 shows the data flow of the cache core 15-0; the data flow of the other cache cores 15-1 to 15-3 is similar. A request multiplexer 101 receives PU0–PU11 request headers from register 64. An arbitration circuit 102 decides which PU is to be selected for a transfer of its request to another multiplexer 103 and a cache address register 104. A response multiplexer 106 receives PU0–PU11 header and data inputs from register 54. An arbitration circuit 107 which operates independently of arbitration circuit 102 decides which PU is to be selected for a transfer of its response to a response OP-register 108 and a cache input register 109. The response OP-register 108 contains the headers A and B of a store operation. The response OP-register 108 provides input to a response finite state machine (FSM) 185 which operates independently of other finite state machines shown in FIG. 7.

The output of the response OP-register 108 is connected to a second input of multiplexer 103 which provides a transfer to a directory read address register 110 of directory array 122. Furthermore, the output of the response OP-register 108 is connected to a cache write register 105 through a two way multiplexer 113. Register 105 hold the cache write address during store operations. The multiplexer 103 and the directory array 122 are controlled by a core finite state machine 186 which works independently of cache arrays 135. A store operation needs only one look up cycle in the directory array 122. The same applies to a linefetch operation which in total needs three cycles, namely read, modify and write to maintain L1 valid copy bits.

The read address register 110 is connected to a first OP-register 111 which holds the headers A and B of requests and which is controlled by core finite state machine (FSM) 186. At the same cycle when headers A and B of a linefetch operation enter the first OP-register 111, the output of the directory array 122 is available indicating whether there exist a L2-match which is herein designated as LFL1, or whether there exist a L2miss which is herein designated as LFL2. If it is a LFL1 the headers A, B of the operation enter a LFL1-OP-register 112 provided this register is free. If it is a LFL2, the headers A, B of the operation enter a second OP-register 114 provided this register is free. If at these points of time LFL1-OP-register 112 is occupied, the headers A and B of the LFL1 have to wait in the first OP-register 111 until the register 112 becomes free.

Similarly, if the second OP-register 114 is occupied, the headers A and B of the LFL2 have to wait in the first OP-register 111 until the register 114 becomes free.

Time uncritical request operations other than line fetches always use the second OP-register 114.

Each of the LFL1-OP-register 112 and the second OP-register 114 are controlled by their own finite state machine (FSM) 190 and 189. Also cache array 135 is controlled by its own FSM 188 which has a different start signal than the core FSM 186; only when the L2 cache is free both FSMs start simultaneously.

Figure 7:
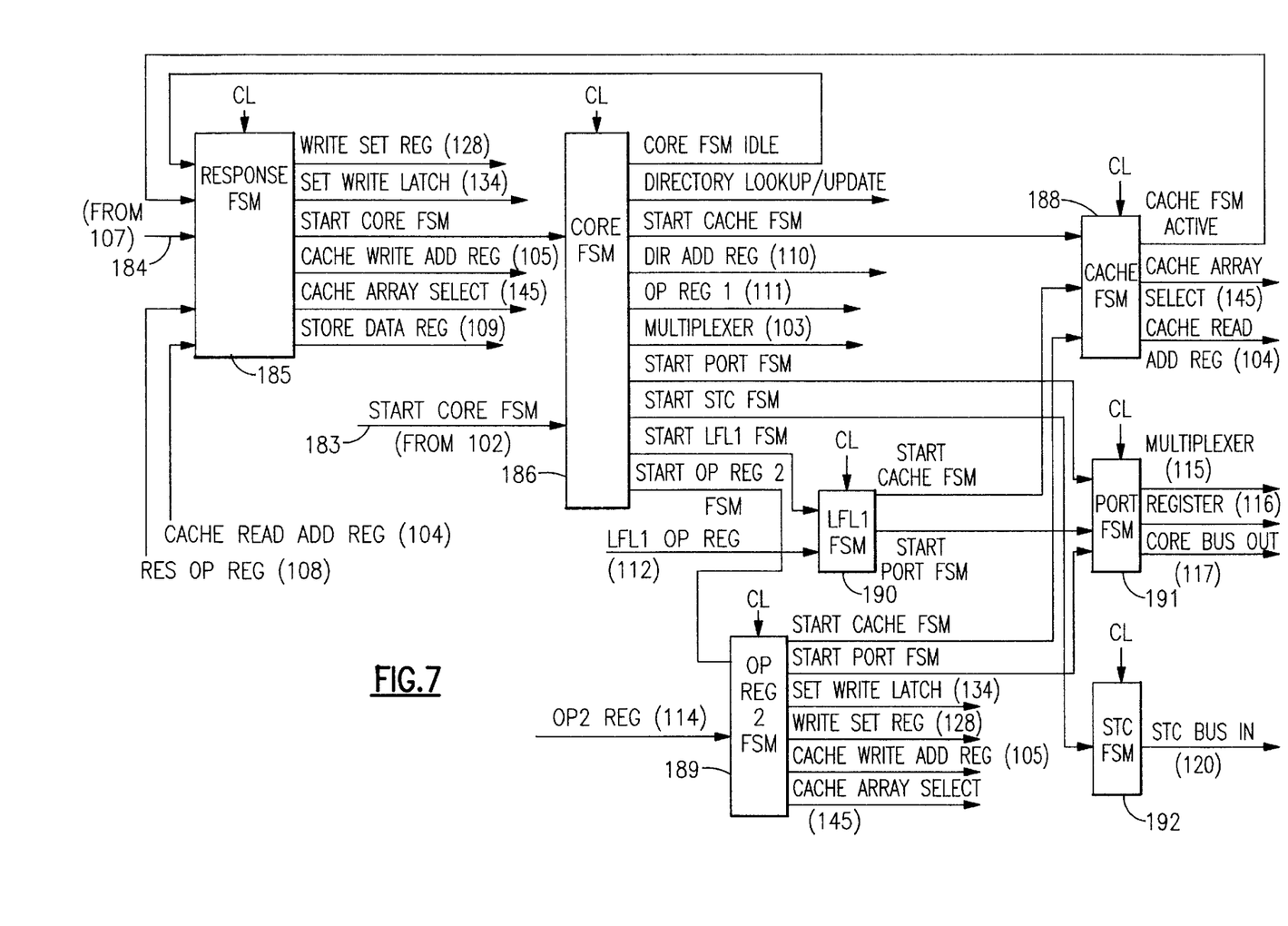
FIG. 7 a general block diagram of finite state machines as used to control the L2 cache core shown in FIG. 4.

The outputs of the first OP-register 111, of the LFL1-OPregister 112 and of the second OP-register are connected through a multiplexer 115 and a register 116 to a multiplexer 117 of the cache core output bus 118. The outputs of the first OP-register 111 and of the second OP-register are connected through a multiplexer 120 to an input bus 121 of the storage controller 16. Multiplexer 120 transfers to STC bus 121 also addresses and data which appear on lines 119 when a cache line, which was selected by a least recently use mechanism, has to be secured in the memory 18 to free the corresponding storage location in the cache. The multiplexer 115 is controlled by a port FSM 191 and multiplexer 120 is controlled by a STC FSM 192(FIG. 7).

The directory array 122 consists of three macros of which in FIG. 4 only the macros 123 and 124 are shown. Each macro is divided in four sets such as set 125. The sets are simultaneously addressed. Each set has an output register 126. The output register 126 of each set is connected by a multiplexer 129 and a modifier circuit 130 back to an input register 131 which is common to both macros 123, 124. The modifier circuit 130 may become is effective if a change of processor ownership on a cache line is required which are part of each entry of the directory 122.

Each of the output registers 126 is associated with a match latch 127 which is set when a directory lookup operation indicates a match in the addressed set of the directory. The match latches 127 control multiplexer 132 and 133 which are connected to output registers 143.

The cache array 135 consists of five macros of which in FIG. 4 only the macros 136, 137 are represented. Each macro is divided in two sets, such as sets 138 and 139 of macro 136, to form a ten way set-associative L2 cache. The inputs of the macros 136, 137 have a common input register 142 which is connected by a multiplexer 141 to the output bus 140 of the storage controller 16 and to store data register 109. The outputs of the pair of sets in each of the macros 136, 137 are connected by registers 143 to one of the multiplexers 132, respectively. The multiplexer 132 are followed by multiplexer 133 which is connected through a register 100 and multiplexer 117 to the cache core output bus 118. The control signals from the match latches 127 select by means of the multiplexer 132 and 133 the output of the accessed set in the corresponding macro of the cache array 135. The outputs of the match latches 127 are also used to load a register 128 which is connected with the cache array by write set select input lines such as lines 155 to select one of the sets for a write operation (FIG. 5).

Figure 5:
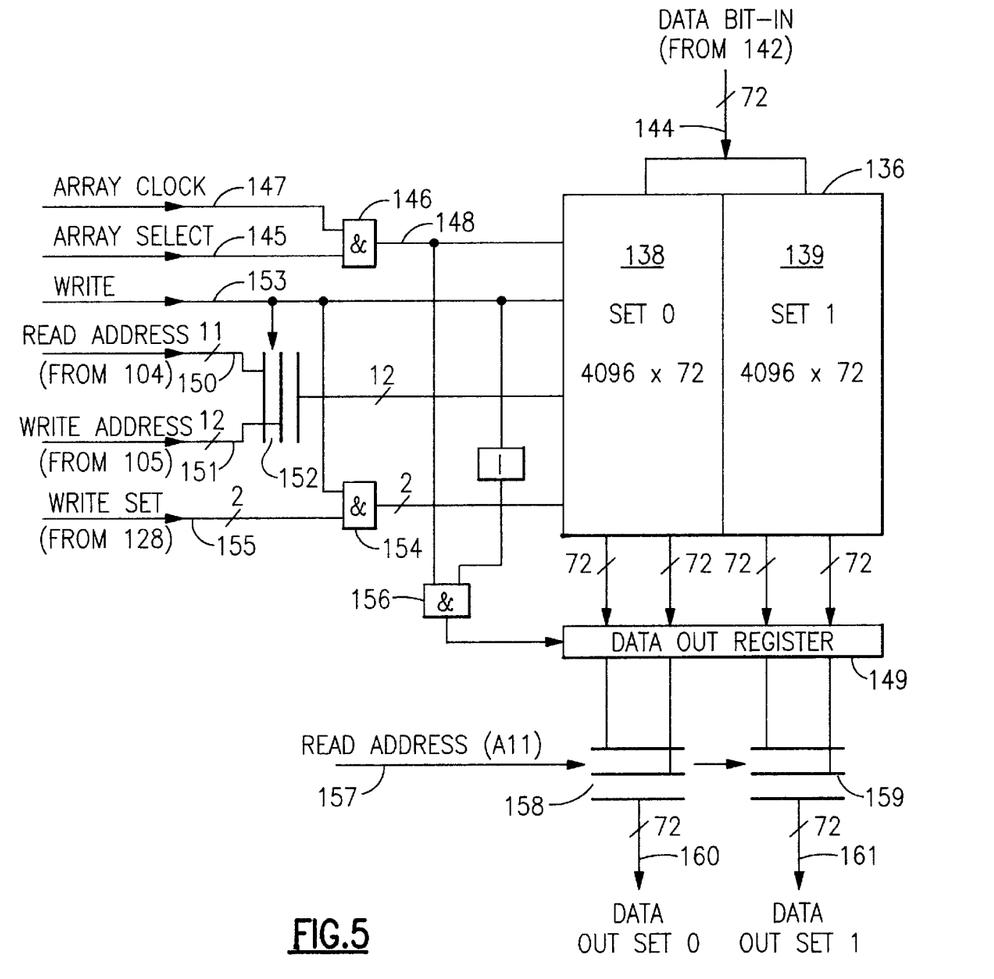
FIG. 5 a logic diagram of a cache macro as contained in the cache core of FIG. 2.

The control logic of one of cache macros namely macro 136 with the sets 138 and 139 is shown in FIG. 5; cache macro 137 and the other three cache macros comprise a similar logic. The macro 136 is selected by a signal on line 145 which is combined by an AND-circuit 146 with an array clock signal on line 147 to generate a signal on line 148. A read address on lines 150 and a write address on lines 151 are applied to the macro 136 through a multiplexer 152 which is controlled by an write control signal from the write latch 134 on line 153. The read address line 150 applies only even addresses to the cache array macro 136. The write latch 134 is set by the response FSM 185 (FIG. 7) if a cache write operation has to be performed. If the cache FSM 188 is active and the cache read address register 104 (FIG. 4) contains an odd address, the write latch 134 must not be set. The signal on line 153 is combined by an AND-circuit 154 with a write set signal on line 155 from register 128 to perform a 8 byte write operation in the selected set of the cache array 136. The signals on the lines 148 and the inverted signal from line 153 are combined by AND-circuit 156 to control the output register 149 of the macro 136. Multiplexer 158 and 159 are controlled by the signal on line 157 representing the low order read address bit and transfer the read out data to lines 160, 161 which are connected to registers 143 (FIG. 4).

From the data input register 142 via line 144 doublewords are written into the cache macro. Each doubleword comprises 8 bytes of 8 bits each and a number of error correction bits which in total results in a data unit of 72 bits. For the read operation only even addresses are used; the read address line 150 thus does not contain the low order bit. Although linefetch data on the PU interface comprise 8 bytes wide data units per cycle, 2×8 bytes are read out in one cycle from the cache set 138 for being stored in the data out register 149. This register requires no extra cycle. Its clock is derived from the array clock. The low order bit A11 of the read address is applied to line 157 to control the multiplexer 158 and 159 for selecting one of the two 8 byte groups from register 149 in the same cycle while the other one of these two 8 byte groups is selected during the next cycle. By this arrangement it is ensured that in each read cycle two data units of 72 bits each are read and that each second cycle is not a read cycle. This second cycle is available for being used as a write cycle. Thus, each read cycle is usually followed by a write cycle if a write operation is simultaneously pending with a read operation. However, there is one exeption: If a read operation starts with an odd address, two subsequent read cycles are required. This is implemented by the cache FSM 188 (FIG. 7). Whenever the cache read address in register 104 is even, the write latch 134 is set. This is done when the store data register 109 contains a valid store shot (8 bytes). Register 109 is forced to hold its contents if the cache read address is odd. The write cycle will then be postponed by one cycle. If a store operation is ongoing and the cache FSM 188 starts, it performs an initial noop cycle if the write latch 134 is on.

Figure 6:
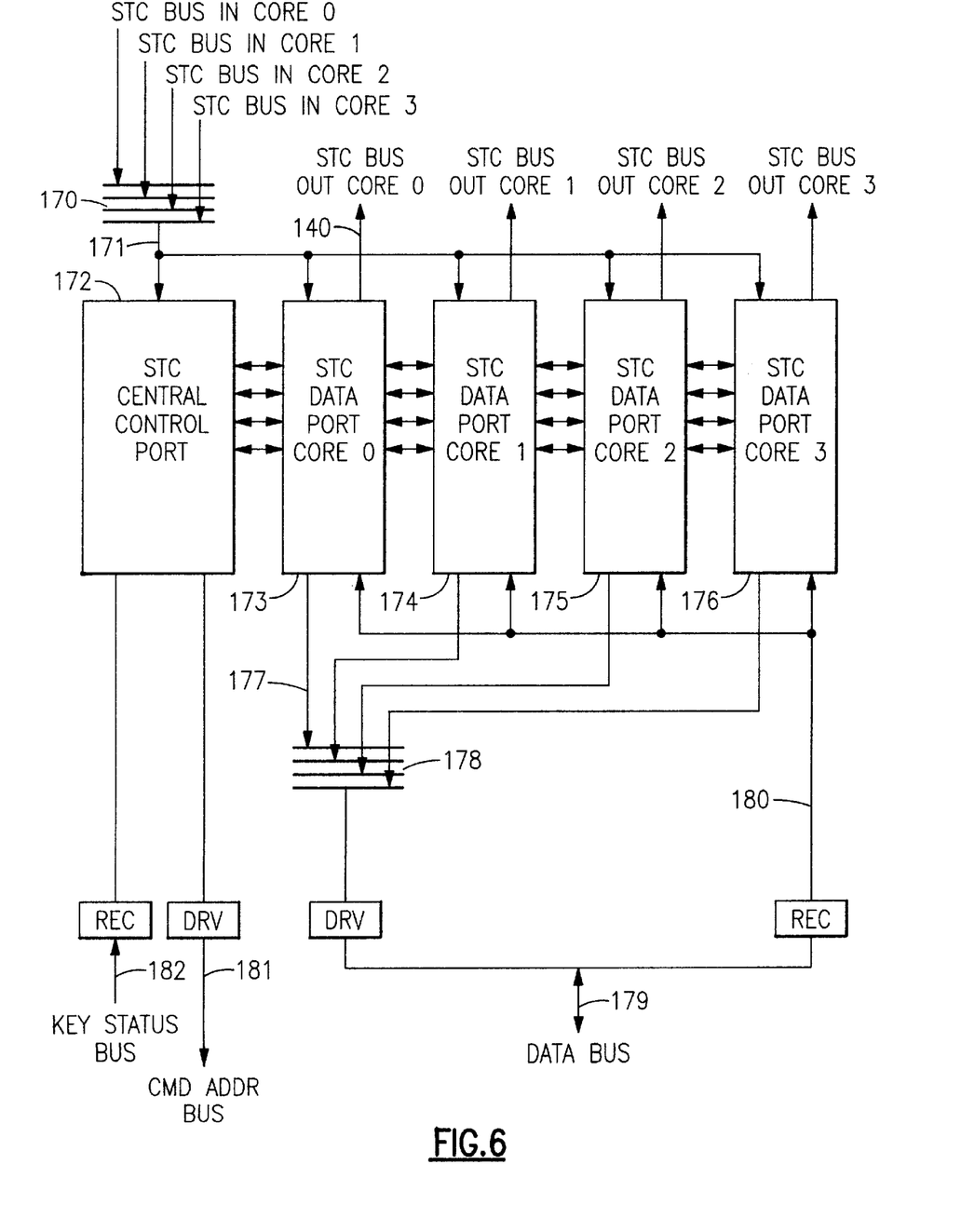
FIG. 6 a block diagram of the data flow of a storage controller port provided in the system of FIG. 1 to connect the shared L2 cache with the memory.

FIG. 6 shows the dataflow of the storage controller 16. The storage controller input busses of the cache cores 15-0 to 15-3 such is bus 121 of cache core 15-0 are connected through a multiplexer 170 and input lines 171 to a central control port 172 and to data ports 173, 174, 175, 176 each of which is assigned to one of the cache cores 15-0 to 15-3. On the memory side, the ports have output lines 177 which are connected through a multiplexer 178 to a memory bus 179 which is bidirectional and also connected to inputs lines 180 of the ports 173–176. On the cache side, each port has an output bus, such as bus 140 of port 173, which is connected to the corresponding one of the cache cores 15-0 to 15-3 as shown for the cache core 15-0 in FIG. 4.

The central control port 172 has an address output bus 181 which is connected to the memory 18. On a key-status bus 182 central control port 172 receives from the memory 18 information on the use status of the data delivered on the memory bus 179.

The control of the L2 cache core shown in FIG. 4 is mainly performed by finite state machines as shown in FIG. 7. The finite state machines and their application for storage control purposes are well known. This is shown, for example, by U.S. Pat. No. 5,490,261 which is involved herein by reference. Each finite state machine runs through a predetermined sequence of discrete control states each of which lasting a predetermined period of time, and in some of said control states the FSM generates control signals to associated circuits. FIG. 7 shows a general block diagram which represents only the most important control functions and signals as well as the interaction between those FSMs used in the embodiment of FIG. 4. FIG. 7 contains seven finite state machines which are a response FSM 185, a core FSM 186, a cache FSM 188, a LFL1 FSM 190, an OP2-register FSM 189, a port FSM 191 and a STC FSM 192. Each of these FSMs is driven by the same clock signals CL where the cycle times depend on the chosen embodiment. The FSMs operate independently of each other as separate control units. For example, the cache FSM 188 may perform a cache operation while the core FSM 186 performs request and response control operations. Interaction between the FSMs take place only by start signals as indicated in FIG. 7. Each of the cores 15-0 to 15-3 contains a set of FSMs 185, 186, 188–192, and each of such set may operate independently of each other in controlling the operations of its cache core.

The main purpose of the response FSM 185 is to control the processing of the store-thru data coming from one of the PU1 to PU11 via the respective port partition 14-0 to 14-11. If a pending response request from one of the PUs is accepted by the arbitration circuit 107, it sends a start signal to the response FSM 185 which then controls the transfer of the headers A, B of that response request into the response OP-register 108 and the transfer of store data shots into the register 109. The active period of the response FSM 185 depends on the number of store shots which is indicated by header B. The response FSM 185 also checks the contents of cache read address register 104 for an odd/even read address and sets write latch 134 only if the read address is even, provided, a read operation is in progress. The write latch can always be set, when there is no cache read operation ongoing. Furthermore, the response FSM 185 starts the core FSM 186 which is responsible for the control of the write and read operations of the directory 122 initiated by both cache requests and PU response requests where the latter have assigned a higher priority than cache requests. The core FSM 186 is active for 1 or 3 cycles depending whether the directory lookup involves a store operation via the response FSM 185 or a request operation. The core FSM 186 loads directory address register 110 via multiplexer 103 and initiates a directory lookup, and it starts OP2-register FSM 189 in case of a miss result from the directory, and it starts the LFL1 FSM 190 in case of a match result. Furthermore, the core FSM 186 starts the cache FSM 188 and the port FSM 191 in any case. The core FSM 186 starts the STC FSM 192 if a cache miss situation arises.

The cache FSM 188 has a different start time than the core 186 except when the L2 cache is not busy. In this case both FSMs start simultaneously. The cache FSM 188 receives its start signal either from the core FSM or from the LFL1 FSM 190 for a delayed linefetch of an LFL1, or from the OP2-register FSM 189 for a LRU line read out. The cache FSM 188 produces a cache array select on line 145 and controls the operation of the cache array 135. The port FSM 191 produces in due time the control signals of the multiplexers 115 and 117 and register 116 for the transfer of data to the core bus out 118.

The OP2-register FSM 189 is active for a plurality of cycles, the number of which is dependent on the memory, to execute a LFL2 by performing a memory access. Furthermore, it sets the write latch 134 when in executing a LFL2 operation data arrive from the memory 18. The core FSM 186 transfers the contents of the first OP-register 111 into the second OP-register 114 to make the first OP-register 111 free for further requests from the PUs, and it starts at due points of time the STC FSM 192 and the port FSM 191 for the data transfer to and from the memory. The STC FSM 192 controls the multiplexer 120 for the transfer of address data and other data to the STC bus-in 121. LFL1 FSM 190 is active for 6 cycles except for cross-L1-cache operations, and controls start and end of a LFL1 operation.

Figure 8:
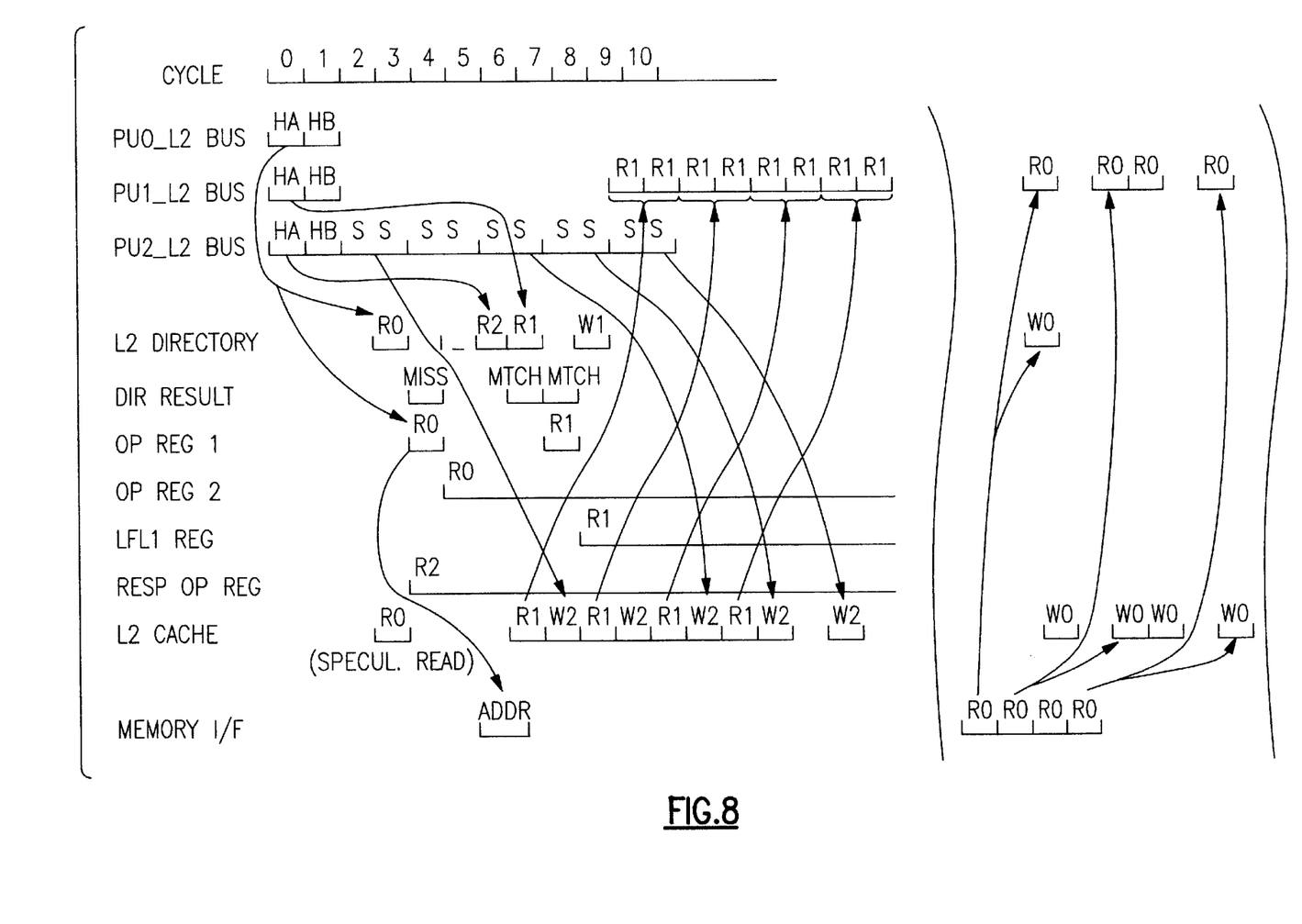
FIG. 8 a time diagram of concurrent operations according to the invention.

As explained above with reference to the FIGS. 4 and 5, LFL1 and LFL2 operations are performed concurrently, and in addition a cache write operation can be performed without additional cycle times when a cache read operation is in progress. The time diagram of FIG. 8 shows an example of this concurrency. In this example, a LFL2 operation is performed for PU0 simultaneously with an LFL1 operation for PU1 and with a store-thru operation comprising 5 data shots for PU2. The operation starts by a decision of the request arbitration circuit 102 to select PU0. The header A from PU0 has entered the cache address register 104 and directory address register 110 for a directory read lookup R0 which is performed under the control of the core FSM 186. Since the cache FSM 188 is not busy at that point of time, the start pulse from the request arbitration circuit 102 is passed thru the core FMS and starts the cache FSM 188 which performs a speculative cache read cycle RO using the address from register 104.

At begin of the next cycle, the first OP-register 111 contains the headers A and B of the request from PU0 and the directory indicates a miss result. This result is latched in the registers 126 and match latches 127 and urges the cache FSM 188 to stop its operation. In addition, the headers A and B of request from PU0 are transferred to the second OP-register 114 under the control of the core FSM 186. Already from the first OP-register 111 a memory operation is initiated and the address is transferred via multiplexer 120, bus 121, storage controller central port 192 to the memory address bus 181.

Up to now, the core FSM 186 has used the directory for three cycles where the third cycle, the directory write cycle, was suppressed since the first cycle resulted in a LFL2. The required directory update cycle for the PU0 request comes late with the data from the memory 18. The core FSM 186 prefers now to select by control of multiplexer 103 the response operation of PU2 which is a store operation, and transfers the directory address of this operation into register 110. Only one cycle is required for a directory lookup to identify the matching cache set. Thereafter the core FSM 186 is started a third time for the linefetch operation of PU1. Simultaneously, the cache FSM 188, which is not busy at that point of time, is started to perform a read cycle R1. The result of this cache read operation are two shots R1,R1 of read data on one of the busses 76–79 (FIG. 3) which data are transferred through register 93, 94 to the busses 40, 41. After this cache read cycle a first hidden cache write cycle W2 of the PU2 response operation is performed. Two store cycles of the PU2- L2 bus 40 result in one cache write cycle W2. Thereafter, the LFL1 operation of PU1 and the store operation of the PU2 response continues in an interleaved manner until PU1 has received 8 data shots R1 by performing four cache read cycles R1 each followed by a write cycle W2. At that point of time also the store operation of PU2 is finished where the store operation did not affect the LFL1 read operation.

Before the fetch data arrive from the memory 18, there are enough free cycles to execute four or more LFL1 operations in total, depending on the memory response time, together with hidden store operations as described. If the LFL2 operation becomes a linestore-linefetch operation (LSLF), which replaces a least recently used cacheline (LRU line) by the cacheline to be stored and which requires to read out the LRU line from the cache and store it in the memory, the cache FSM 188 would be started under the control of the OP2-register FSM 189 provided the cache FSM 188 is not busy. During the resulting cache read operation hidden store operations are possible as well. However, since the LSLF operation requires the cache FSM 188 for 8 read cycles to read out the LRU line, the cache FSM is not available during this period for an LFL1 operation. A LFL1 operation thus must wait until the LRU line read out is completed.

When the fetch data of the LFL2 operation for PU0 arrives on the data bus 179 (FIG. 6), eight write cycles W0 in the cache and one directory update cycle WO are required to perform corresponding update operations. In the embodiment shown a different clock domain is used on the memory interface, this explains the gaps in the L2 internal clock domain. Since LFL2 operations are less frequent than LFL1 operations, no interleave cache writes for memory operations with other operations are deemed required.

The time diagram of FIG. 8 shows that both the LFL1 operation for PU1 and the LFL2 operation for PU0 are executed concurrently and that the store operation for PU2 is interleaved with them and does not require separate cycles at all. The concurrency of said operations extent to all cache cores 15-0 to 15-3. Each of the cache cores can concurrently run LFL1 operations, LFL2 operations and store operations for each one of the processing units PU0–PU11. Thus, the embodiment shown may concurrently execute up to 12 operations of said type.

What is claimed is:

1. A high performance cache unit in a computer system having a plurality of processing units (PU0–PU1) for performing multiprocessing tasks, each of the processing units being connected by port means (14) to a shared level n cache (15) which serves as buffer between said processing units and a memory (18), said shared cache includes arbitration means (102) for performing a priority based selection among pending cache access requests and directory means (122) for generating a match or miss indication for the cache core in response of a requested access, comprising:

(a) first storage means (64–67) for storing data requests of one or more processing units;

(b) second storage means (54–57) for storing processing unit response requests of one or more processing units;

(c) first and second arbitration and select means (101, 102 and 106, 107) for performing priority based selections independent of each other for said data requests and response requests in said first and second storage means;

(d) address register means (110) associated to said first and second arbitration and select means for storing the address portions of said selected data request or said selected response requests to perform a directory lookup operation;

(e) first cache register means (112, 114, 104) associated to said first arbitration and select means to store address and operation command data of a linefetch-match operation and independently thereof address and operation command data of a linefetch-miss operation during their execution;

(f) second cache register means (108) associated to said second arbitration and select means to store address and operation command data of a response operation during their execution; and (g) control means (185, 186, 188, 189) for interleaving said linefetch-match and linefetch-miss operations and said response operation during their execution; and (h) a cache array (135) capable for storing a plurality of byte data units each containing n bytes; and (i) read access means (150, 152) for performing a read operation of two data units concurrently in one operation cycle leaving each second operation cycle available to a write operation; and (j) control means (185) for interleaving in succeeding operation cycles a read cycle of said linefetch-match operation with a write cycle of said response operation; and wherein said read access means (150, 152) are divided in two parts, where a first part (150, 152) applies even read addresses to the cache array (136) and a second part (157) consisting of the low order read address bit is applied to multiplexer means (158, 159) for selecting one or the other of the two data units which are concurrently read from the cache array.

2. The cache unit as recited in claim 1, wherein said shared level n cache (15) is divided into a plurality of parallel cache cores (15-0 to 15-3) operating independently of each other in parallel to execute data requests and response requests of one or more processing units, and wherein said port means comprise a plurality of ports (14-0 to 14-11) connecting each of the processing unit (PU0–PU11) to each of said cache cores.

3. The cache unit as recited in claim 2, wherein said first and second storage means (64–67, 54–53), said first and second arbitration and select means (101, 102 and 106, 107), said address register means (104), said first and second cache register means (112, 114, 108), said control means (185, 186, 188, 189) and said cache array (135) are assigned to each of said plurality of parallel cache cores (15-0 to 15-3).

4. The cache unit as recited in claim 2, wherein each of said ports (14-0 to 14-11) comprise a first-in-first-out storage (42) for storing a plurality of data requests of one or more processing units and further said cache unit includes a first-in-first-out storage (43–46) for each of said cache cores (15-0 to 15-3) for storing a plurality of response requests of one or more processing units directed to the related cache core.

5. The cache unit as recited in claim 2, wherein said data request and said response request of said plurality of processing units include headers (A and B) which contain address, command and status data and wherein the address data represent a directory address and a cache address.

6. The cache unit as recited in claim 5, further comprising in at least one of said plurality of cache cores a first OP-register means (111) which is selectively connected to said first arbitration and select means (101, 102) for initially storing the header (A, B) of a data request operation.

7. The cache unit as recited in claim 6, further comprising in at least one of said plurality of cache cores a LFL1-OP-register means (112) which is connected to said first OP-register means (111) for storing the header (A, B) of a linefetch-match operation during its execution.

8. The cache unit as recited in claim 6, further comprising in at least one of said plurality of cache cores a second OP-register means (114) which is connected to said first OP-register means (111) for storing the header (A, B) of a linefetch-miss operation during its execution.

9. The cache unit as recited in claim 5, further comprising in at least one of said plurality of cache cores a response OP-register means (108) which is connected to said second arbitration and select means (106, 107) for initially storing the header (A, B) of a response request.

10. The cache unit as recited in claim 9, further comprising in at least one of said plurality of cache cores a store data register means (109) which is connected to said second arbitration and select means (106, 107) for successively storing the write data of a response request.

11. The cache unit as recited in claim 10, further comprising in at least one of said plurality of cache cores a cache write address register means (105) which is connected to said response OP-register means (108) for storing the cache write address of a response request operation during its execution.

12. The cache unit as recited in claim 5, further comprising in at least one of said plurality of cache cores a cache read address register means (104) which is connected to said first arbitration and select means (101, 102) for storing the cache read address of a data request operation during its execution.

13. The cache unit as recited in claim 1, further comprising a write latch means (134) which generates a write control signal to said cache array (135) and which is set by said control circuit (185) if said cache read address register (104) indicates an even read address and said control means (188) indicate a current cache read operation.

14. The cache unit as recited in claim 2, wherein each of said ports (14-0 to 14-11) comprises a first-in-first-out storage (74) to store a plurality of cache requests for being transferred to one of the plurality of processing units, and further comprising a first-in-first-out storage (75) to store a plurality of responses from of one or more cache cores for being transferred to one of the plurality of processing units.

15. The cache unit as recited in claim 1, further comprising storage controller means (16) to connect said plurality of cache cores (15-0 to 15-3) to the memory (18).

16. A method for high performance caching of instructions and data in a computer system having a plurality of processing units (PU0–PU11) for Performing multiprocessing tasks, each of the processing units being connected by port means (14) to a level n shared cache (15) which serves as a buffer between said processing units and a memory (18), the method uses a priority based arbitration among pending cache access requests and cache directory accesses for generating a match or miss indication in response of a requested cache access, comprising the steps of:

(a) separately storing data requests (42, 64–67) and response requests of one or more processing units (43–46, 54–57);

(b) priority based selection of one of said stored data requests and independent thereof priority based selection of one of said stored response requests (101, 102 and 106, 107);

(c) using the address portions of said selected data requests or response requests for performing a directory lookup operation (110);

(d) storing independently of each other address and operation command data of a linefetch-match operation and a linefetch-miss operation during their execution (112, 114);

(e) storing address and operation command data of a response request operation during their execution (108); and (f) interleaving execution of said linefetch-match and linefetch-miss operations and said response request operation (185, 186, 188, 189); and (g) storing a Plurality of byte data units each containing n bytes; performing a read operation of two data units concurrently in one operation cycle leaving each second operation cycle available to a write operation; and (h) interleaving in succeeding operation cycles a read cycle of said linefetch-match operation with a write cycle of said response request operation;

wherein said read operation step uses read addresses which are divided into two parts, where a first part (150, 152) consisting of even read addresses for addressing two data units in said cache array (136) and a second part (157) consisting of the low order read address bit which serves to select one or the other of the two data units concurrently read from the cache array.

17. The method as recited in claim 16, wherein said shared level n cache (15) is divided into a plurality of parallel cache cores (15-0 to 15-3), comprising the steps of: operating said cache cores independently of each other in parallel to execute data requests and response requests of one or more processing units; and connecting each of the processing units (PU0–PU11) to each of said cache cores.

18. The method as recited in claim 17, further comprising the steps of: first-in-first-out storing a plurality of data requests of one or more processing units; and first-in-first-out storing for each of said cache cores (15-0 to 15-3) a plurality of response requests from one or more processing units and directed to the related cache core.

19. The method as recited in claim 17, wherein said data request and said response request of said plurality of processing units include headers (A and B) which contain address, command and status data and wherein the address data represent a directory address and a cache address.

20. The method as recited in claim 19, wherein the execution of a data request comprises the steps of:

initially storing the header (A, B) of a data request operation in a first register (111);

storing the header (A, B) of a linefetch-match operation during its execution in a second register (112); and storing the header (A, B) of a linefetch-miss operation during its execution in a third register (114).

21. The method as recited in claim 19, wherein the execution of a response request comprises the steps of:

initially storing the header (A, B) of a response request in a response operation register (108);

successively storing the write data of a response request in a store data register (109); and storing the cache write address of a response request operation during its execution in a cache write address register (105).

22. The method as recited in claim 16, further comprising the step of generating a write control signal to said cache array (135) if the execution of a data request indicates an even read address.

23. The method as recited in claim 17, further comprising the steps of first-in-first-out storing of a plurality of cache requests for being transferred to one of the plurality of processing units (74); and first-in-first-out storing a plurality of responses from of one or more cache cores for being transferred to one of the plurality of processing units (75).

24. The method as recited in claim 16, further comprising the step of transferring data between said plurality of cache cores (15-0 to 15-3) and said memory (18) for each cache core independently of the data transfer for other cache cores.

* * * * *